United States Patent [19]

Sanger

[11] Patent Number: 4,661,028
[45] Date of Patent: Apr. 28, 1987

[54] REVERSE CUTTING EXPANSION TAP

[76] Inventor: Leon A. Sanger, 85 S. Cambridge Dr., Lemoore, Calif. 93245

[21] Appl. No.: 831,317

[22] Filed: Feb. 20, 1986

[51] Int. Cl.⁴ .............................................. B23G 5/14
[52] U.S. Cl. .................................. 408/165; 408/156; 10/145
[58] Field of Search ................. 10/142, 143, 144, 145; 408/154, 156, 157, 158, 159, 161, 163, 164, 165, 168, 172, 180, 711, 714

[56] References Cited

U.S. PATENT DOCUMENTS

| 53,996 | 4/1866 | Loomis | 408/168 |
|---|---|---|---|
| 391,777 | 10/1888 | Buck | 10/145 |
| 826,244 | 7/1906 | Grace | 408/156 |
| 2,284,768 | 6/1942 | Ramsdel | 10/145 |
| 2,360,472 | 10/1944 | Brussell | 408/163 |
| 2,616,103 | 2/1947 | Stecher | 10/145 |
| 4,090,808 | 5/1978 | Nannen | 408/222 |
| 4,097,180 | 6/1978 | Kwieraga | 408/154 |

FOREIGN PATENT DOCUMENTS

| 18795 | 3/1929 | Australia | 10/142 |
|---|---|---|---|
| 104846 | 3/1917 | United Kingdom | 10/145 |
| 563103 | 7/1944 | United Kingdom | 10/145 |

Primary Examiner—Gil Weidenfeld
Assistant Examiner—Daniel W. Howell
Attorney, Agent, or Firm—Gordon K. Anderson

[57] ABSTRACT

An expansion tap having a body (20) with a head (22) on one end and angularly tapered threads (26) on the other, with a bore (24) running therethrough. The body (20) has a shoulder stop (38) in the middle and a plurality of flutes (28) through the threaded portion. A capscrew (46) penetrates the bore (24) and is threadably engaged to a forcing cone (40) contiguous with the bore on the threaded end. A plurality of aligning ribs (44) engage the flutes (28), preventing rotation when the capscrew is tightened. The tap is inserted into a damaged threaded hole engaging the original threads in the middle and subsequently expanded by tightening the capscrew (46), thus straightening the tapered thread portion until the lands are parallel. Removal of the tap straightens and recuts the damaged threads.

6 Claims, 8 Drawing Figures

REVERSE CUTTING EXPANSION TAP

TECHNICAL FIELD

This invention relates to hand operated thread cutting taps in general, and more specifically to an expandable tap for damaged threads that is inserted, expanded, and retracted cutting threads in reverse.

BACKGROUND ART

Previously, thread cutting taps have been limited to rigid devices with radial grooves cut into a threaded shank, forming lands having threads and cutting edges at the intersection of the land and groove.

Some attempt has been made to utilize movable taps for chasing threads or high speed boring and tapping, however, these devices have been complex and costly to manufacture.

A search of the prior art did not disclose any patents that read directly on the claims of the instant invention, however, the following U.S. patents were considered related:

| Patent No. | Inventor | Issue Date |
| --- | --- | --- |
| 4,097,180 | Kwieraga | June 27, 1978 |
| 4,090,808 | Nannen | May 23, 1978 |
| 2,616,103 | Stecher | Nov. 4, 1952 |
| 2,284,768 | Ramsdell | June 2, 1942 |

Kwieraga teaches a collapsible tap with a plurality of chaser elements extending axially from a cylindrical body. These elements are spread outwardly by a conical shaped plunger providing the camming surface, so that axial movement of the plunger produces radial movement of the elements. Terminal portions engage grooves in the side of each element and produce a continuous bias permitting axial movement therebetween.

Nannen discloses a two component tapping device allowing a thread cutting member to be inserted into a threaded hole, and a second element inserted as a guide member wedging tightly adjacent to the cutting member. The pair are rotated as a unit to tap or retap the work surface.

Stecher utilizes a plurality of pivotal thread chasers rotatably mounted into extending slots. Each chaser is provided with a thread cutting portion with a taper, preferably be axial inclination, with respect to a centrally located body. The chasers are shifted outwardly by the cam action of a conical member, manually or automatically, into thread cutting engagement with the workpiece.

Ramsdell employs a plurality of fingers having cutting blades extending therefrom. The fingers are in communication with radial slots within the bore of a body. A conical plug is moved, axially forcing the fingers outwardly. While the fingers are expanded by rotating the cone from the front end, it is not possible to make the adjustment by the nut on the bolt by itself requiring access to both ends of the tool. It will be clearly seen that the prior art has attempted to use expanding cutting elements, but has not been able to simply and easily accomplish the adjustment while positioned within an already threaded hole.

DISCLOSURE OF THE INVENTION

The usual procedure for retapping a threaded hole that has been damaged by cross threading, is to insert a tap from the back into the original threads and rotate until the damaged threads are straightened, and any obstructing material is cut-away. This procedure is simple and uses conventional taps, well known in the art, and repairs the threads to a usable condition, as the damaged portion is normally on the entering side. However, damage by cross threading is caused by the male element entering the hole on an angle, trying to cut its own threads, instead of mating with the existing angular surface. This, therefore, places the damaged threads on the entering side, as normally the male element binds tighter the further it enters the hole.

The problem arises when the threaded hole is in a blind position in that it is only available from one side. An example is the head of an internal combustion engine where the spark plug is screwed into the combustion chamber, as there is no way to reach the inside of the threaded hole. This example is further developed in that with todays advanced technological automobiles and trucks, much of the space around the engine is taken up by ancillary equipment, along with sophisticated exhaust headers, and the like. This densely packaged engine compartment requires the mechanic to work in rather adverse conditions when replacing spark plugs. Some stations are hard to reach and awkward to work with, combined with hand tools that develop considerable torque, making it easy to cross thread the spark plug and damage the head. Previously, the alternatives have been to insert a conventional tap into the hole and recut new threads. The problems with this is that there is no way of matching the threads, and if they are not aligned accurately when the tap is rotated and new threads are cut, there is not sufficient material left to maintain the structural integrity required for operation of the engine. A second method is to drill the threads out and use an insert, such as a helical coil having threads on the inside, as well as the outside. In many cases, this requires complete removal of the head, as there is not sufficient clearance to align a drill motor with the hole obviously being a very costly procedure.

With this in mind, it is a primary object of the invention to repair damaged threads in a blind hole without the addition of auxillary components, while still leaving the integrity of the threads in tact. This is accomplished by inserting a tool having angularly tapered threads into the hole with the tapered portion passing over the damaged area and engaging the parent threads. The tapered end is then expanded and the tool rotatably removed.

An important object of the invention does not cutaway unnecessary metal during the removal, instead it reforms the damaged portion into its original position swaging the major diameter of the thread into the desired form while forcing the metal from the minor diameter into the basic angular orietation.

Another object of the invention is the fact that the undamaged threads are completely unaffected. Since in most cases the damage occurs on the first few threads, the remaining threads retain their full strength, and if the first few threads are not structurally competent, the function still remains intact with the remaining structure.

Still another object of the invention provides a tool that will not obstruct the threaded hole if it is accidently broken off when it is threaded out. This is due to the fact that only half of the tapered threads are attached to the body on each side, and if broken, simply conform to their original taper, and are easily removed. Conventional taps, on the other hand, create a major problem when broken off, especially if flush with the outside of the hole. Drilling procedures using special tools or acids are used if this occurs, being time consuming and costly.

Yet another object of the invention makes the use simple and easy to understand. Basic instruction is all that is necessary, and when expanding the tool, the screw is rotated until it bottoms on a shoulder, limiting the travel to the exact degree of expansion eliminating any judgement decision by the user.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
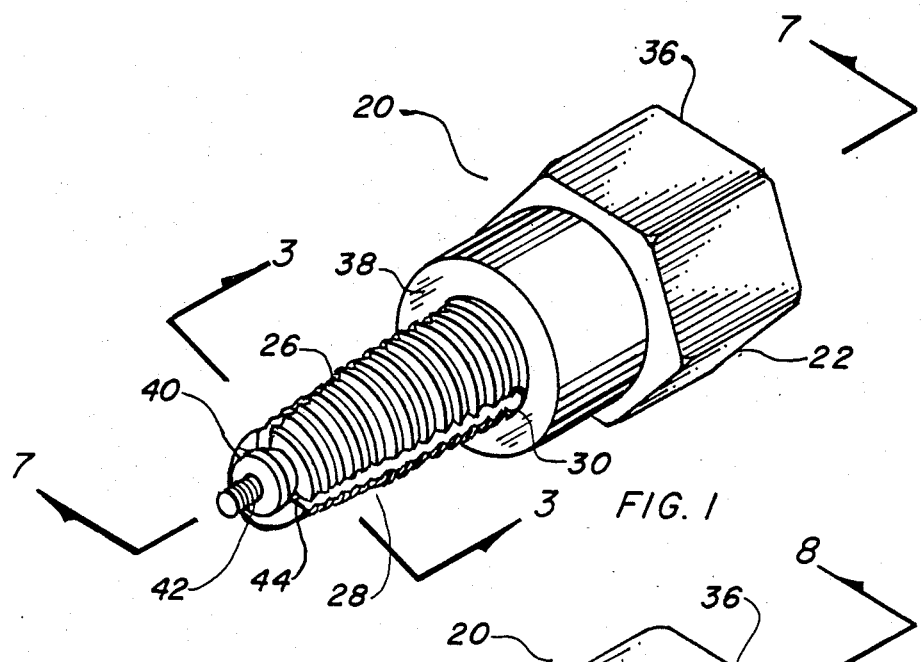
FIG. 1 is a partial isometric view of the preferred embodiment in the retracted position.

The best mode for carrying out the invention is presented in terms of a preferred embodiment. The preferred embodiment, as shown in FIGS. 1 through 8, is comprised of a body 20 having a head 22 on one end and a bore 24 therethrough. This body 20 is formed of a ferrous material capable of being heat treated to increase the tensile strength and durability to cut threads, and yet, have sufficient elasticity to stretch into a second configuration without yielding. The body 20 contains a plurality of angularly tapered threads 26 formed on the ends opposite the head 22. These threads are located on resilient fingers which extend forward from the body 20 and contain outer surfaces that form a relatively small angle with the axis of rotation of the tap. Between these fingers are a plurality of parallel flutes 28 that continue from the outside through to the bore 24 in the center. These flutes 28 start at the beginning of the threads 26 and continue throughout with a relief hole 30 at the end to relieve stress created by the change in angular configuration. The flutes 28 form lands therebetween. The number of lands and flutes is determined by the size of the tap. A small tap, say number 10, or even a one quarter inch (0.635 centimeters) and smaller, is limited to two lands where the larger sizes would contain three or more lands, as illustrated in FIGS. 1 through 5.

Figure 3:
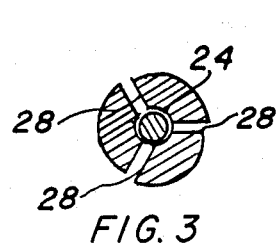
FIG. 3 is a cross-sectional view taken along lines 3—3 of FIG. 1.
Figure 4:
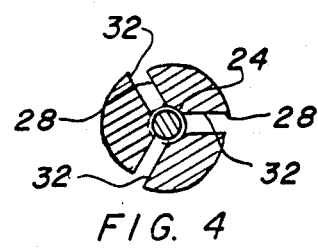
FIG. 4 is a cross-sectional view taken along lines 4—4 of FIG. 2.

At the intersection of the tapered threads 26 and the flutes 28, a cutting edge 32 is formed with the leading edge the full diameter and the trailing edge contoured inwardly, as shown in FIGS. 3 and 4. This cutting edge 32 has a sharp surface on the thread profile where the threads terminate and is flat or concave on the inside of the flute walls, creating a cutting surface which is on the reverse side of the thread lands, compared to a conventional tap. This cutting edge 32 may have zero rake when flat, with positive or negative rake, if configured with a concentric cutting face. These cutting edges 32 are capable of grooving and reforming the threads when rotated in a counterclockwise direction for conventional right handed threads. The natural at rest full length taper of the threaded portion further contains a slight relieving of the crest of the first few teeth to distribute the cutting action over several teeth and assist the insertion beyond the damaged portion. This chamfer angle is formed between the beginning of the chamfer and the axis of the device in an axial plane at the cutting edge. In the unexpanded state, the device has the characteristics of a conventional tapered tap, and in the expanded state, converts into the configuration of a bottoming tap.

The bore 24 in the body 20 further contains a chamfer 34 on the end opposite the head 22, providing an abutting surface on the threaded end.

On the extreme end of the head 22, wrenching means 36 are provided to furnish a gripping surface for hand tools allowing rotation of the device in a threaded workpiece. This wrenching means 36 may be in the shape of a rectangle, square, or multisurfaced, with a hexagonal shape being preferred. This preferred shape allows six flats to be utilized in geometrical array corresponding to conventional hand held tools, well known in the art, and accessible to most mechanics.

Figure 2:
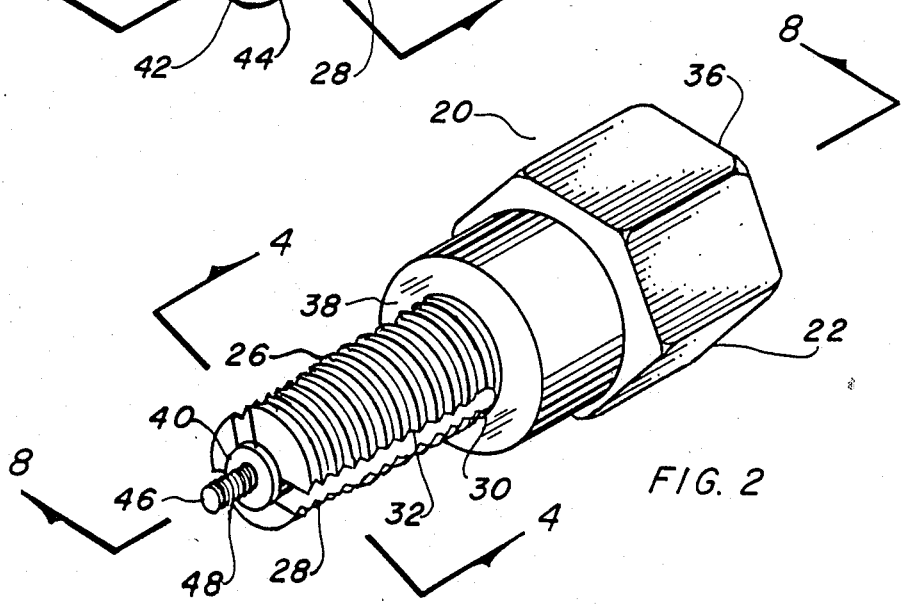
FIG. 2 is a partial isometric view of the preferred embodiment in the expanded position.

A shoulder stop 38 is disposed between the head 22 and the threads 26 and limits the allowable penetration of the threads into a workpiece by creating an obstruction. This stop 38 is best illustrated in FIGS. 1 and 2 and in cross-section in FIGS. 7 and 8.

An expansion forcing cone 40 with a threaded hole 42 in the center contiguously engages the chamfer 34 on the bore 24. This forcing cone 40 is shown removed from the invention in FIG. 6 and is formed with a truncated body and a plurality of alignment ribs 44 protruding from the angular edge of the cone, so as to abut with each slit 28 in the body 20. The purpose of the alignment rib 44 is to prevent rotation of the cone 40 when it is in contact with the bore 24.

Figure 5:
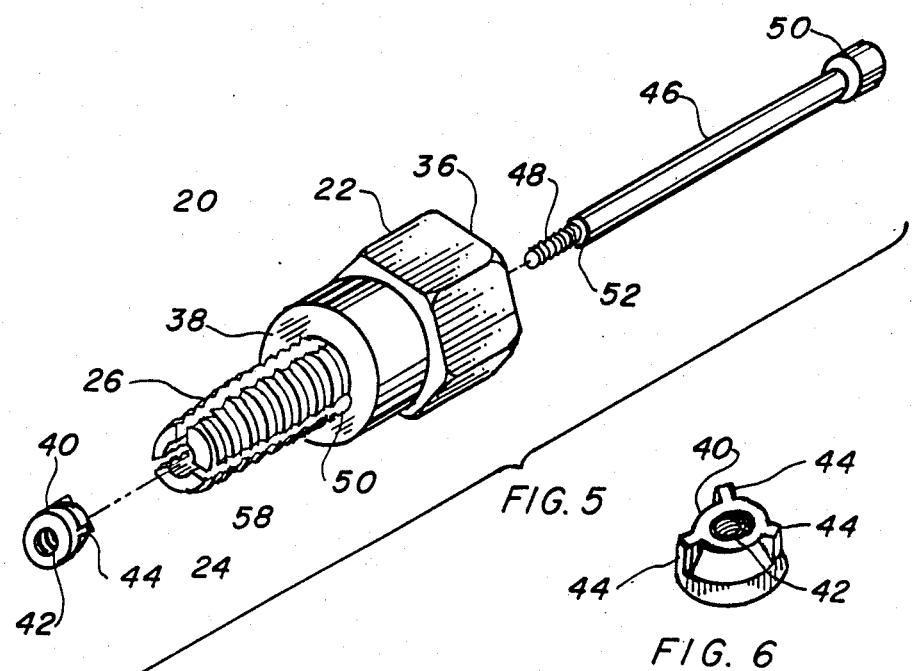
FIG. 5 is an exploded view of the preferred embodiment.
Figure 6:
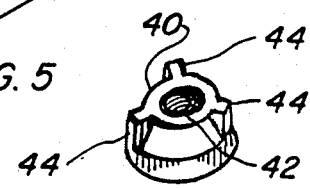
FIG. 6 is a partial isometric view of the forcing cone completely removed from the invention for clarity.
Figure 7:
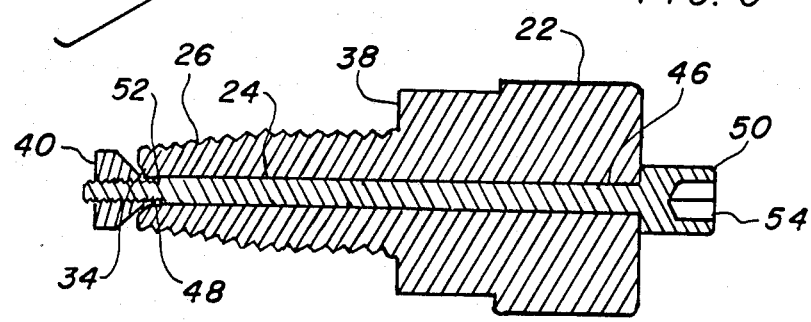
FIG. 7 is a cross-sectional view taken along lines 7—7 of FIG. 1.
Figure 8:
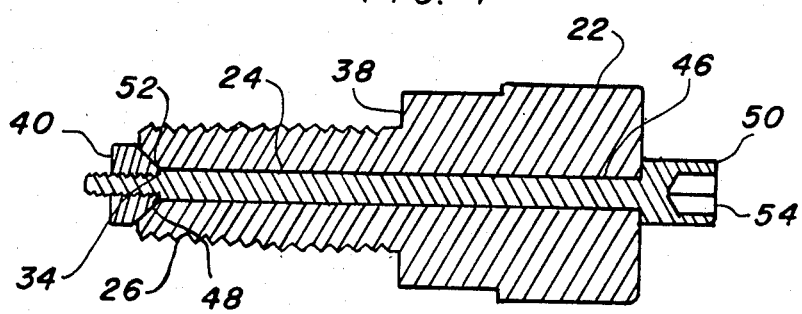
FIG. 8 is a cross-sectional view taken along lines 8—8 of FIG. 2.

The final element of the invention is illustrated best in FIG. 5, and is shown assembled in the balance of the views. This element is a tensioning capscrew 46 having threads on one end and a head 50 on the other. Further, the capscrew 46 has a shoulder 52 on the threaded end and a socket 54 in the head. The socket 54 provides an attachment point for a hand held wrench to be inserted for manual operation, and the shoulder 52 limits the amount of free travel of the threads 48.

The capscrew 46 is inserted into the bore 24 of the body 20 from the head 22 end and threadably engages the forcing cone 32 in such a manner as to compressibly urge the tapered threads 26 from the angular taper to a parallel thread relationship by the rotation of the capscrew 46 into the forcing cone 40. The chamfer 34 is formed coterminously with the cone 40, and as spaced relationship of the cone 40 with the capscrew head 50 decreases, the threads 26 are forced outwardly moving the thread engagement into a parallel alignment. This movement is limited by the capscrew shoulder 52 until the threads are perfectly parallel. Operation of the reverse cutting expansion tap is as follows:

As the tap is rotated into the damaged threaded hole, the undamaged threads near the center of the hole engage the threads of the tap and proper alignment is made. The tap is continued into the hole until it bottoms out against the shoulder stop 38 of the body 20. At this time, the threads of the tap are properly aligned with the undamaged portions of the threads of the hole and is in proper position within the hole. Once seated, the capscrew 46 is rotated with an appropriate wrench until the shoulder 52 hits the cone 40 expanding the cutting faces 32 of the tap. The alignment rib 44 of the expansion forcing cone 40 prevents the cone 40 from turning while tightening the capscrew 46, expanding the cutting edges 32 of the tap for proper engagement with the undamaged portions of the threads. With the tap set in the hole and expanded, it is extracted from the hole by turning it in the counterclockwise or reverse direction (as compared to a conventional tap) with an appropriate socket wrench. As the tap is being withdrawn from the hole, its threads ride in proper alignment with the undamaged threads of the hole. When the cutting edges of the tap reach the damaged threads of the hole, the threads of the hole are reformed in proper alignment with the undamaged threads by the cutting action of the tap.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A reverse thread cutting expansion tap comprising:
   (a) a body having a head on one end and a bore therethrough;
   (b) a plurality of angularly tapered threads formed into the body on the end opposite the head, the threads are located on resilient fingers which extend forward from the body having outer surfaces forming a relatively small angle with the axis of rotation of the tap, said fingers having a plurality of parallel flutes therebetween, further, said threads interface with existing threads in a workpiece cutting damaged threads therewith;
   (c) wrenching means on said head providing a gripping surface for hand tools to rotate said tap within a threaded hole in a workpiece;
   (d) a shoulder stop disposed between said head and said tapered threads for limiting the allowable penetration of the threads into a workpiece by creating an obstruction therewith;
   (e) an expansion forcing cone, having a threaded hole in the center thereof, contiguously engaging said bore in the body on the tapered threaded end; and,
   (f) a tensioning capscrew having threads on one end and a head on the other, inserted into said bore in the body threadably engaging said forcing cone in such a manner as to expandably urge said tapered threads from an angular taper to a parallel thread relationship by the rotation of said capscrew into the forcing cone, moving the intersection of the cone with the bore end outwardly forcing the threads into parallel alignment, for cutting threads when the tap is inserted into a workpiece, expanded, and removed in reverse rotation.

2. The invention as recited in claim 1 wherein said wrenching means further comprise: a plurality of flats disposed in hexagonal orientation providing interface with hand held tools of the opposite configuration.

3. The invention as recited in claim 1 further comprising: a cutting face at the intersection of said tapered threads and said flutes having a sharp edge on a leading side capable of cutting and reforming threads when forceably urged thereupon.

4. The invention as recited in claim 1 wherein said bore on the threaded end further comprises: a chamfer therein formed coterminously with said forcing cone providing an abutting surface for compelling the tapered threads into parallel alignment with an extended bearing surface.

5. A reverse thread cutting expansion tap comprising:
   (a) a body hving a head on one end and a bore therethrough;
   (b) a plurality of angularly tapered threads formed into the body on the end opposite the head, the threads are located on resilient fingers which extend forward from the body having outer surfaces forming a relatively small angle with the axis of rotation of the tap, said threads having a plurality of parallel flutes therebetween, further, said threads interface with existing threads in a workpiece cutting damaged threads therewith;
   (c) wrenching means on said head providing a gripping surface for hand tools to rotate said tap within a threaded hole in a workpiece;
   (d) a shoulder stop disposed between said head and said tapered threads for limiting the allowable penetration of the threads into a workpiece by creating an obstruction therewith;
   (e) an expansion forcing cone, having a threaded hole in the center thereof, contiguously engaging said bore in the body on the tapered threaded end; and, a truncated body having a plurality of alignment ribs protruding from the angular edge of the cone, so as to abutt with each flute in the tapered threads preventing rotation of the cone while said capscrew is rotated urging the tapered threads from an angular taper to a parallel thread relationship; and,
   (f) a tensioning capscrew having threads on one end and head on the other, inserted into said bore in the body threadably engaging said forcing cone in such a manner as to expandably urge said tapered threads from an angular taper to a parallel thread relationship by the rotation of said capscrew into the forcing cone, moving the intersection of the cone with the bore end outwardly forcing the threads into parallel alignment, for cutting threads when the tap is inserted into a workpiece, expanded, and removed in reverse rotation.

6. A reverse thread cutting expansion tap comprising:
   (a) a body having a head on one end and a bore therethrough;
   (b) a plurality of angularly tapered threads formed into the body on the end opposite the head, the threads are located on resilient fingers which extend forward from the body having outer surfaces forming a relatively small angle with the axis of rotation of the tap, said threads having a plurality of parallel flutes therebetween, further, said threads interface with existing threads in a workpiece cutting damaged threads therewith;
   (c) wrenching means on said head providing a gripping surface for hand tools to rotate said tap within a threaded hole in a workpiece;
   (d) a shoulder stop diposed between said head and said tapered threads for limiting the allowable penetration of the threads into a workpiece by creating an obstruction therewith;

(e) an expansion forcing cone, having a threaded hole in the center thereof, contiguously engaging said bore in the body on the tapered threaded end; and, (f) a tensioning capscrew having threads on one end and a head on the other, inserted into said bore in the body threadably engaging said forcing cone in such a manner as to expandably urge said tapered threads from an angular taper to a parallel thread relationship by the rotation of said capscrew into the forcing cone, moving the intersection of the cone with the bore end outwardly forcing the threads into parallel alignment, for cutting threads when the tap is inserted into a workpiece, expanded, and removed in reverse rotation, said capscrew further having a shoulder on the threaded end and a socket on the head end, said shoulder having a location so positioned as to limit the travel of said forcing cone to open said tapered threads into exact parallel alignment and said socket to provide an attachment point for a hand held wrench to be inserted for manual operation thereof.

* * * * *